United States Patent
Siragusa

(10) Patent No.: US 7,455,192 B2
(45) Date of Patent: Nov. 25, 2008

(54) OVERMOLDED ADHESIVE HOLE PLUG

(75) Inventor: George Siragusa, Chicago Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 800 days.

(21) Appl. No.: 10/980,448

(22) Filed: Nov. 3, 2004

(65) Prior Publication Data

US 2006/0091144 A1    May 4, 2006

(51) Int. Cl.
*B65D 39/00* (2006.01)
*B65D 39/04* (2006.01)

(52) U.S. Cl. ............... 220/789; 220/795; 220/DIG. 19; 220/792; 220/801; 220/802; 220/803; 220/780

(58) Field of Classification Search .............. 220/359.1, 220/359.4, 780, 784–792, 794–796, 801–804, 220/DIG. 19; 215/355; 138/89–95; 296/1.06, 296/154

See application file for complete search history.

(56) References Cited

U.S. PATENT DOCUMENTS

| 3,851,794 | A | * | 12/1974 | Hehl ........................... 220/789 |
| 3,935,686 | A | * | 2/1976 | Dozois ...................... 52/302.7 |
| 3,944,107 | A | * | 3/1976 | Wallace et al. .............. 220/326 |
| 3,990,604 | A | * | 11/1976 | Barnett et al. ............... 220/787 |
| 4,091,962 | A | * | 5/1978 | van Buren, Jr. ............. 220/326 |
| 4,094,436 | A | * | 6/1978 | Birmingham ............... 220/315 |
| RE30,326 | E | * | 7/1980 | van Buren, Jr. ............. 220/326 |
| 4,334,632 | A | * | 6/1982 | Watanabe ................... 220/787 |
| 4,363,420 | A | | 12/1982 | Andrews ..................... 220/307 |
| 4,391,384 | A | | 7/1983 | Moore, III et al. .......... 220/359 |
| 4,413,748 | A | * | 11/1983 | Kessler et al. ............... 220/281 |
| 4,463,870 | A | * | 8/1984 | Coburn et al. ............... 220/787 |
| 4,494,671 | A | * | 1/1985 | Moore et al. ............. 220/257.1 |
| 4,534,088 | A | | 8/1985 | Ricke ........................... 24/295 |
| 4,560,083 | A | * | 12/1985 | Danico ........................ 220/786 |
| 4,583,654 | A | | 4/1986 | Pufpaff et al. ............... 220/307 |
| 4,588,104 | A | | 5/1986 | Danico ........................ 220/326 |
| 4,588,105 | A | | 5/1986 | Schmitz et al. ............. 220/359 |
| 4,606,474 | A | | 8/1986 | Dudzik ........................ 220/307 |
| 4,629,356 | A | | 12/1986 | Hayashi ................... 403/408.1 |
| 4,646,932 | A | * | 3/1987 | Masler ........................ 220/789 |
| 4,664,574 | A | | 5/1987 | Kasai ........................... 411/508 |
| 4,674,910 | A | | 6/1987 | Hayashi ................... 403/408.1 |
| 4,697,719 | A | * | 10/1987 | Allen ........................ 220/258.2 |
| 4,700,981 | A | * | 10/1987 | Seyler ........................ 296/1.06 |
| 4,760,935 | A | | 8/1988 | Van Den Beld et al. ..... 220/307 |
| 4,761,319 | A | | 8/1988 | Kraus et al. ................... 428/99 |
| 4,762,296 | A | | 8/1988 | Kraus et al. ................ 248/74.2 |
| 4,781,488 | A | | 11/1988 | Hayashi ................... 403/408.1 |

(Continued)

FOREIGN PATENT DOCUMENTS

EP    0 911 132 A1    12/2000

*Primary Examiner*—Anthony D Stashick
*Assistant Examiner*—Ned A Walker
(74) *Attorney, Agent, or Firm*—Mark W. Croll; Paul F. Donovan

(57) ABSTRACT

A plug for closing a hole in a panel includes an enlargement for inserting into the hole and a flange for engaging the panel. Activatable adhesive on the flange adheres the plug to the panel upon activation. Segments of adhesive are applied to the enlargement to wedge the plug in the hole, for holding the plug in position prior to activation of the adhesive.

12 Claims, 2 Drawing Sheets

U.S. PATENT DOCUMENTS

| | | | | |
|---|---|---|---|---|
| 4,784,285 A * | 11/1988 | Patel | ................... | 220/782 |
| 4,787,795 A | 11/1988 | Kraus | ................... | 411/306 |
| 4,801,040 A | 1/1989 | Kraus | ................... | 220/306 |
| 4,823,978 A | 4/1989 | Pufpaff | ................... | 220/306 |
| 4,832,234 A | 5/1989 | Peterson | ................... | 220/306 |
| 4,850,778 A | 7/1989 | Clough et al. | ................... | 411/433 |
| 4,883,194 A | 11/1989 | Fernandes | ................... | 220/307 |
| 4,902,182 A | 2/1990 | Lewis | ................... | 411/510 |
| 4,938,378 A | 7/1990 | Kraus | ................... | 220/307 |
| 4,953,742 A | 9/1990 | Kraus | ................... | 220/367 |
| 4,987,656 A | 1/1991 | Sato | ................... | 24/297 |
| 4,993,903 A | 2/1991 | Kraus | ................... | 411/510 |
| 4,998,642 A | 3/1991 | Kraus | ................... | 220/307 |
| 4,999,887 A | 3/1991 | Kraus | ................... | 24/662 |
| 5,014,866 A * | 5/1991 | Moore | ................... | 215/364 |
| 5,014,939 A | 5/1991 | Kraus et al. | ................... | 248/70 |
| 5,046,223 A | 9/1991 | Kraus | ................... | 24/453 |
| 5,069,357 A | 12/1991 | Anderson | ................... | 220/307 |
| 5,106,223 A | 4/1992 | Kraus | ................... | 403/11 |
| 5,161,711 A | 11/1992 | Picozza et al. | ................... | 220/282 |
| 5,181,626 A | 1/1993 | Daenen et al. | ................... | 220/282 |
| 5,191,513 A | 3/1993 | Sugiura et al. | ................... | 361/399 |
| 5,224,624 A | 7/1993 | Kraus | ................... | 220/201 |
| 5,263,895 A | 11/1993 | Kraus et al. | ................... | 454/162 |
| 5,267,667 A * | 12/1993 | Cozzani | ................... | 220/787 |
| 5,348,183 A | 9/1994 | Luch et al. | ................... | 220/256 |
| 5,353,472 A | 10/1994 | Benda et al. | ................... | 16/2 |
| 5,448,809 A | 9/1995 | Kraus | ................... | 24/453 |
| 5,454,479 A | 10/1995 | Kraus | ................... | 220/307 |
| 5,499,737 A | 3/1996 | Kraus | ................... | 220/307 |
| 5,505,324 A * | 4/1996 | Danico | ................... | 220/201 |
| 5,513,769 A * | 5/1996 | de Baets | ................... | 220/787 |
| 5,636,953 A | 6/1997 | Jaeger et al. | ................... | 411/82 |
| 5,647,713 A | 7/1997 | Ge et al. | ................... | 411/509 |
| 5,651,634 A | 7/1997 | Kraus | ................... | 403/408.1 |
| 5,658,110 A | 8/1997 | Kraus | ................... | 411/510 |
| 5,689,863 A | 11/1997 | Sinozaki | ................... | 24/297 |
| 5,702,133 A | 12/1997 | Pavur et al. | ................... | 292/80 |
| 5,706,559 A | 1/1998 | Oliver et al. | ................... | 24/297 |
| 5,816,543 A | 10/1998 | Kraus | ................... | 248/73 |
| 5,852,854 A | 12/1998 | Pierrot et al. | ................... | 24/297 |
| 5,870,799 A * | 2/1999 | Benda | ................... | 16/2.1 |
| 5,873,623 A * | 2/1999 | Dunton et al. | ................... | 296/154 |
| 5,893,480 A * | 4/1999 | Dore et al. | ................... | 220/784 |
| 5,906,342 A | 5/1999 | Kraus | ................... | 248/74.1 |
| 5,937,486 A | 8/1999 | Bockenheimer | ................... | 24/297 |
| 6,076,781 A | 6/2000 | Kraus | ................... | 248/73 |
| 6,159,409 A * | 12/2000 | Benda | ................... | 264/255 |
| 6,296,136 B1 * | 10/2001 | Huet | ................... | 220/233 |
| 6,557,208 B2 * | 5/2003 | Huet | ................... | 16/2.1 |
| 6,901,632 B2 * | 6/2005 | Boyce | ................... | 16/231 |
| 2001/0049858 A1 * | 12/2001 | Huet | ................... | 16/2.1 |
| 2007/0108216 A1 * | 5/2007 | Kurth et al. | ................... | 220/789 |

* cited by examiner

OVERMOLDED ADHESIVE HOLE PLUG

FIELD OF THE INVENTION

The present invention relates generally to plugs for holes in panels and, more specifically, to adhesive plugs for automobile panels using adhesive activated by heat from paint curing ovens to adhere the plug to the panel.

BACKGROUND OF THE INVENTION

In the manufacture of automobiles and many other devices, wall structures used in the device include a frame covered with a skin or panel. Frequently, a further panel our outer covering is applied thereover. The internal space of a wall may contain a variety of structures and apparatuses to which access is required during manufacture and assembly. Further, it is sometimes necessary that an opening be provided in panels for hand or tool access to fasteners and the like. Often, after assembly is complete, there is no further need for access through such openings in panels.

It is desirable that assembly access openings be closed for both appearance and function. An opening in a panel provides a path for contaminants to pas from one side of the panel to the other side of the panel, potentially fouling or damaging components. Moisture from rain, snow, vehicle washings and the like can accumulate within a wall structure, causing corrosion from the inside out. Therefore, it is desirable not only to close such openings but also to seal the opening in a watertight manner.

Various plug structures have been used to seal panel openings, some with more success than others. In one known arrangement, a body shaped to fill the opening is provided with a thermal adhesive on a flange surrounding the body. The adhesive is activated to create a watertight bond of the plug to the panel when the panel is placed in a cure oven after painting. In some instances, a problem is experienced in retaining the plug in proper position during the necessary handling and movement of the panels after the panel has been plugged and while the panel is being painted and moved into the cure oven. Various mechanical fasteners have been used to retain the plug in proper location to close the hole. Such fasteners can add considerable cost and may require a time consuming procedure for fastening.

What is needed in the art is a watertight plug that is inexpensive, reliable, easy to install and secure, even before final bonding.

SUMMARY OF THE INVENTION

The present invention provides a thermally bonded hole plug, including a body configured to fill and cover the hole and a thermally activated adhesive for bonding the plug to the panel. Extensions of the adhesive disposed between the hole perimeter and the plug wedge the plug in the hole prior to bonding.

In one aspect thereof, the present invention provides a plug for closing a panel defining a hole. The plug includes a body having an enlargement shaped to fit within the opening and a flange extending outwardly from the enlargement. The flange is of sufficient dimension to prevent the body from passing through the hole. An activatable adhesive on the body has a segment disposed on the enlargement for engaging the panel within the hole to form an interference fit of the enlargement within the hole.

In another aspect thereof, the present invention provides a plug for filling a hole in a panel with a body having a center and a side along an edge of the center. A flange projects outwardly from the side. A heat activatable adhesive is provided on the flange and in a plurality of discrete segments along at least a portion of the side to engage the panel within the hole.

In a still further aspect thereof, the present invention provides a method of making a plug to close a hole in a panel, with steps of forming a body including an enlargement with a center and a side to substantially fill the hole, and a flange for engaging the panel adjacent the hole; applying an activatable adhesive in a bead on the flange; and applying segments of the adhesive along the side of the enlargement between the flange and the center of the enlargement.

An advantage of the present invention is providing a hole plug that is inexpensive to manufacture and simple to install.

Another advantage of the present invention is providing a hole plug that is secure even before final bonding and that stays in position during necessary movement of the panel to which it is attached.

A still further advantage of the present invention is providing a hole plug that is quick to install.

Other features and advantages of the invention will become apparent to those skilled in the art upon review of the following detailed description, claims and drawings in which like numerals are used to designate like features.

Figure 1:
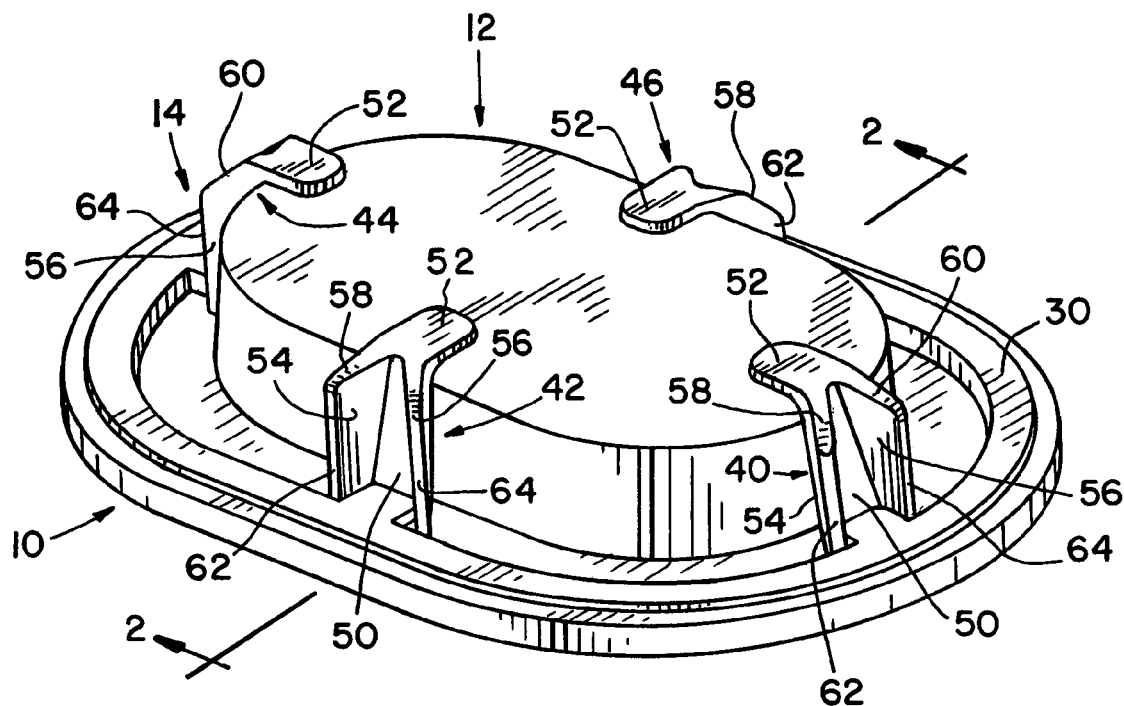
FIG. 1 is a perspective view of a plug in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a hole plug in accordance with the present invention. Plug 10 includes a body 12 and adhesive 14 disposed thereon. Body 12 can be plastic, metal or the like, and adhesive 12 is a thermally activated adhesive applied to body 12 in an overmolding processes familiar to those skilled in the art.

Figure 2:
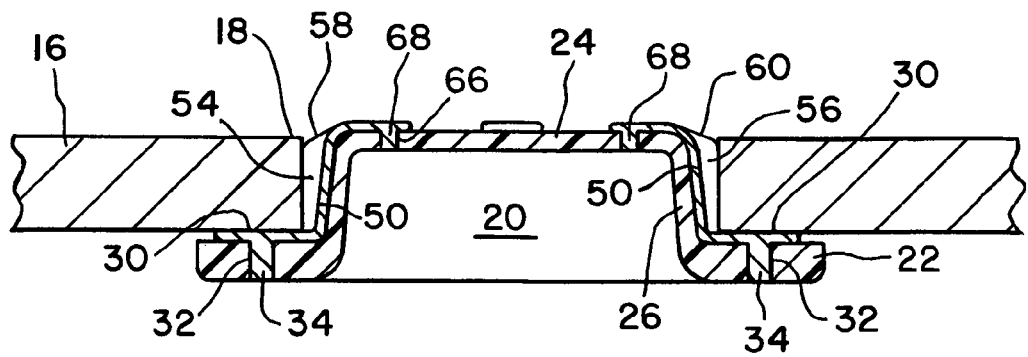
FIG. 2 is a cross-sectional view of the plug shown in FIG. 1, taken along line 2-2 of FIG. 1, and illustrating the plug installed in a panel.
Figure 3:
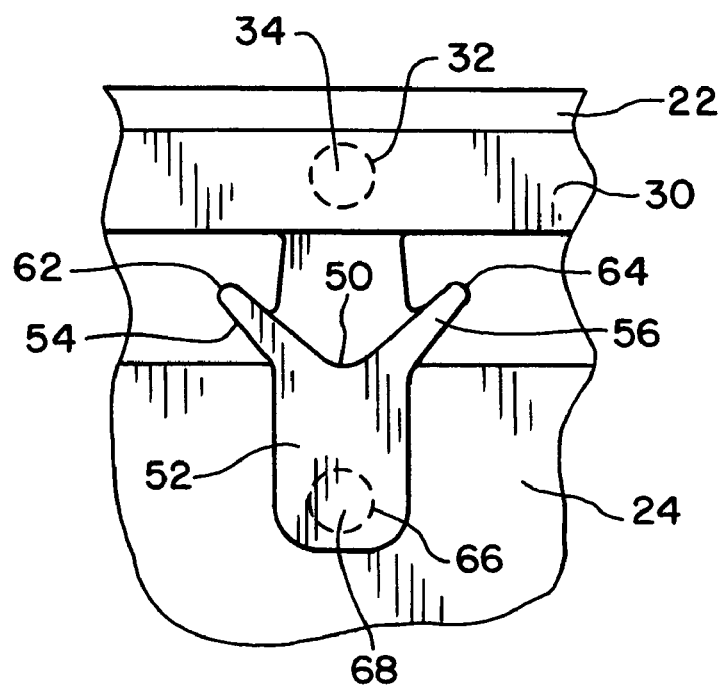
FIG. 3 is an enlarged fragmentary top view of a portion of the plug shown in FIG. 1.

As seen most clearly in FIG. 2, plug 10 is configured in such a manner to be installed in a panel 16 having a hole 18. Thus, plug 10 generally includes a centrally located enlargement 20 and a peripheral flange 22 disposed around enlargement 20. Enlargement 20 is of a size and shape with respect to the size and shape of hole 18 to be inserted in and substantially fill hole 18. Flange 22 is larger than hole 18 and, with plug 10 fully inserted into hole 18, flange 22 engages panel 16 in such a manner as to prevent plug 10 from being inserted completely through hole 18. Plug 10 and specifically enlargement 20 and flange 22 are shaped, sized and configured with respect to hole 18 to completely close hole 18. Thus, the generally oval shape of plug 10 shown in the drawings is merely exemplary, and plug 10 can be round, square or of complex shapes as required for the type, size and shape of hole 18 to be closed thereby. Further, the thickness of enlargement 20 can be varied as necessary for the structure and size of panel 16.

Enlargement 20 includes a center 24 and a side 26 depending therefrom, at the periphery thereof. As shown in FIG. 2, enlargement 20 is hollow. However, those skilled in the art will readily understand that enlargement 20 can also be solid, a honeycomb structure, or other suitable configuration having a thickness and strength as necessary to fill hole 18 for the particular application.

Flange 22 projects outwardly from side 26, generally at an opposite edge thereof from center 24. Side 26 is a substantially continuous structure that surrounds center 24, and flange 22 is a further substantially continuous body extending about side 26. It should be understood that body 12 can be a monolithic structure made as a cast piece of metal or plastic.

Adhesive 14 is applied to plug 10 in an overmolding process. Commonly used heat activated adhesives are rubber-like, being firm yet flexible following application and before bonding. Suitable heat activated adhesives are widely available. Known suitable adhesives are available from ND Industries, Troy Mich. Adhesive 14 is applied in a bead 30 on flange 22, somewhat outwardly of enlargement 20. Bead 30 is positioned on flange 22 to engage an area of panel 16 near to hole 18, to adhere plug 10 to panel 16 when adhesive 14 is activated by heat. A plurality of apertures 32 can be provided in flange 22, to receive adhesive fillings 34, as the adhesive is applied. Fillings 34 promote retention of bead 30 on flange 22.

Adhesive 14 is further provided with one or more segments 40, 42, 44, 46 extending along side 26 substantially from flange 22 to center 24. Four such segments 40, 42, 44, 46 are shown in the drawings; however, those skilled in the art will readily understand that depending upon the size and shape of hole 18 and plug 10 to fill hole 18, more or fewer segments 40, 42, 44, 46 can be used.

In the exemplary embodiment shown, each segment 40, 42, 44, 46 is contiguous with bead 30 such that adhesive 14 is a substantially monolithic body applied on plug 10. However, it is also contemplated that adhesive 14 can be applied in separate, individual pieces not connected to each other. Each segment 40, 42, 44, 46 includes a length 50 thereof in substantial contact with side 26, and a tab 52 overlapping onto center 24. Wings 54, 56 are provided substantially coextensive with length 50, along opposite sides thereof. To facilitate installation of plug 10 into hole 18 of panel 16, distal ends 58, 60 of wings 54, 56 on segments 40, 42, 44, 46 are tapered away from tabs 52. Wings 54, 56 extend from length 50 generally angularly outwardly away from the outer surface of side 26. Outer most edges 62, 64 of wings 54, 56 define an outer perimeter slightly larger than the size of hole 18. Along the extent of segments 40, 42, 44 and 46 enlargement 20 can be provided with one or more apertures 66, similar to apertures 32 to receive fillings 68 similar to fillings 34, for holding segments 40, 42, 44 and 46 in position. In the exemplary embodiment, apertures 66 are provided in center 24.

Figure 4:
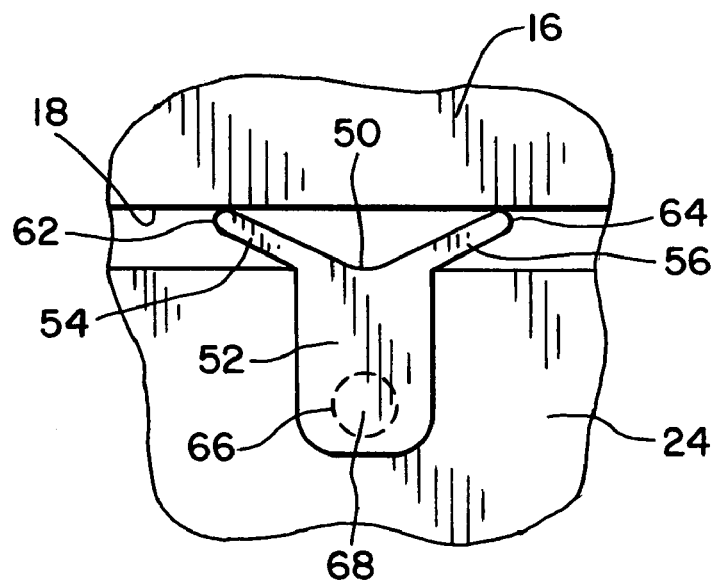
FIG. 4 is a top view similar to FIG. 3, but illustrating the plug installed in a hole of a panel.

During installation of plug 10 in hole 18 of panel 16, body 12 is positioned with enlargement 20 substantially centered with respect to hole 18. As plug 10 is pushed into hole 18, outer edges of distal ends 58, 60 may contact the edge of panel 16 defining hole 18. With sufficient force applied to push enlargement 20 into hole 18, outermost edges 62, 64 of wings 54, 56 on segments 40, 42, 44, 46 deflect inwardly toward side 26, wedging plug 10 within hole 18 of panel 16. FIG. 4 illustrates outermost edges 62,64 wedged within hole 18 of panel 16. Although a wedging effect is shown and described, it should be noted that the invention contemplates other suitable mechanical attachment systems. In one alternative embodiment, the flexible wings include serrations or the like that are adapted to catch on an under side of the panel rather than or including the wedge effect on the inside of the hole. In any event, the plug 10 remains in proper position with respect to hole 18 as panel 16 is moved and manipulated as necessary for painting and other treatment prior to curing adhesive 14. Upon heating, which may occur in a paint-curing oven simultaneously with the curing of paint, adhesive 14 is activated such that bead 30 adheres plug 10 to panel 16. Segments 40, 42, 44, 46 of adhesive 14 may also become fluid, flowing into any space between plug 10 and panel 16 further adhering plug 10 to panel 16.

While plug 10 has been described for use with a heat activated adhesive 14, those skilled in the art should understand that other types of activatable adhesive also can be used advantageously. Heat activatable adhesives are commonly used in many industries and have been described for exemplary purposes. However, other types of environmentally activated adhesives also can be used advantageously.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A plug for closing a panel defining a hole, said plug comprising:

a body having an enlargement shaped to fit within the hole and a flange extending outwardly from said enlargement, said enlargement including a center and a side extending between said center and said flange, said flange being of sufficient dimension to prevent said body from passing through the hole; and an activatable adhesive for adhering the plug to the panel, said activatable adhesive being firm yet flexible and activatable by heat so that it can flow into any associated space between the plug and the panel, said activatable adhesive disposed on said body, said activatable adhesive having a segment disposed on said side of said enlargement for engaging the panel within the hole and forming an interference fit of said enlargement within the hole, said segment including a length in substantial contact with said side, and deflectable wings extending from opposite sides of said length angularly away from said side, and said segment including a tab extending from said deflectable wings and overlapping onto said center.

2. The plug of claim 1, said flange surrounding said enlargement.

3. The plug of claim 2, said adhesive including a bead on said flange substantially surrounding said enlargement.

4. The plug of claim 1, said side being substantially normal to said flange, and said activatable adhesive forming a plurality of segments with deflectable wings adjacent said side.

5. The plug of claim 4, said flange surrounding said enlargement.

6. The plug of claim 5, said adhesive including a bead on said flange substantially surrounding said enlargement.

7. A plug for filling a hole in a panel, said plug comprising:
a body having a center and a side along an edge of said center and a flange projecting outwardly from said side; and
a heat activatable adhesive disposed on said flange and in a plurality of segments along at least a portion of said side to engage the panel within the hole and for adhering the plug to the panel, said activatable adhesive being firm yet flexible and activatable by heat so that it can flow into any associated space between the plug and the panel, said segments of said adhesive extending along said side from said flange to said center, and said adhesive segments each comprising a tab overlapping onto said center, said segments including lengths in substantial contact with said side, and wings extending from said lengths angularly away from said side, such that each said segment includes two said wings on opposite sides of said lengths and said tab extends from said wings.

8. The plug of claim 7, said center and said flange disposed along opposite edges of said side.

9. The plug of claim 7, said adhesive being a monolithic body.

10. The plug of claim 7, said side being a continuous structure surrounding said center.

11. The plug of claim 10, said flange being a continuous body surrounding said side.

12. A method of making a plug to close a hole in a panel, said method comprising the steps of:
forming a body having an enlargement shaped to fit within the hole and a flange extending outwardly from said enlargement, said enlargement including a center and a side extending between said center and said flange, said flange being of sufficient dimension to prevent said body from passing through the hole;
applying an activatable adhesive in a bead on the flange; and
applying segments of the adhesive along the side of the enlargement between the flange and the center of the enlargement for engaging the panel within the hole and forming an interference fit of said enlargement within the hole, wherein said step of applying segments of adhesive includes forming deflectable wings of the adhesive on the segments, such that each segment includes a length in substantial contact with said side, two wings extending from opposite sides of each said length angularly away from said side, and a tab extending from said wings and overlapping onto said center, said activatable adhesive adapted for adhering the plug to the panel, such that said activatable adhesive is firm yet flexible and activatable by heat so that it can flow into associated spaces between the plug and the panel.

* * * * *